US007191031B2

(12) United States Patent
Akama

(10) Patent No.: US 7,191,031 B2
(45) Date of Patent: Mar. 13, 2007

(54) REVERSE ROTATION PREVENTING ELECTRONIC CAM CURVE GENERATING METHOD BASED ON ELECTRONIC CAM TYPE ROTARY CUTTER CONTROL AND CONTROL DEVICE THEREFOR

(75) Inventor: Makoto Akama, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/540,865

(22) PCT Filed: Dec. 22, 2003

(86) PCT No.: PCT/JP03/16462

§ 371 (c)(1),
(2), (4) Date: Jun. 27, 2005

(87) PCT Pub. No.: WO2004/060597

PCT Pub. Date: Jul. 22, 2004

(65) Prior Publication Data

US 2006/0055359 A1 Mar. 16, 2006

(30) Foreign Application Priority Data

Dec. 27, 2002 (JP) ............................ 2002-382409

(51) Int. Cl.
*G06F 19/00* (2006.01)

(52) U.S. Cl. ........................ 700/170; 700/63; 318/159; 493/429

(58) Field of Classification Search .................. 700/69, 700/63, 46, 181, 170, 18, 159, 169; 318/569, 318/560, 567, 572, 576; 83/37, 318; 493/429
See application file for complete search history.

(56) References Cited

U.S. PATENT DOCUMENTS

| | | | | |
|---|---|---|---|---|
| 5,263,413 | A * | 11/1993 | Ikeguchi | 101/183 |
| 5,697,881 | A * | 12/1997 | Nishihara | 493/429 |
| 5,826,479 | A * | 10/1998 | Suzuki et al. | 83/318 |
| 5,950,531 | A * | 9/1999 | Uchiyama | 100/353 |
| 6,781,339 | B1 * | 8/2004 | Ikeguchi | 318/569 |

FOREIGN PATENT DOCUMENTS

| | | | |
|---|---|---|---|
| JP | 60-255309 | A | 12/1985 |
| JP | 64-71614 | A | 3/1989 |
| JP | 2000-198084 | A | 7/2000 |

* cited by examiner

*Primary Examiner*—Kidest Bahta
(74) *Attorney, Agent, or Firm*—Sughrue Mion, PLLC

(57) ABSTRACT

It is an object of the invention to provide a reverse rotation preventing electronic cam curve generating method of an electronic cam type rotary cutter control which serves to prevent the reverse rotation of a cutter.

According to the invention, there is provided an electronic cam curve parameter setting unit 28 for previously calculating a critical cutting length $L_{jag}$ from which an electronic cam curve passing through a point having an acceleration of 0 and a speed of 0 is obtained by setting a rotor diameter r of a rotary cutter 5, the number of blades M disposed at regular intervals on a rotor, synchronizing speed coefficients $\beta_1$ and $\beta_2$ for regulating synchronizing speeds in cutting, and synchronizing angles $\theta_1$ and $\theta_2$, comparing the critical cutting length $L_{jag}$ with a set cutting length $L_{set}$ of a processed product set by an operator, and generating an electronic cam curve pattern for preventing a reverse rotation when the set cutting length $L_{set}$ is greater.

14 Claims, 8 Drawing Sheets

REVERSE ROTATION PREVENTING ELECTRONIC CAM CURVE GENERATING METHOD BASED ON ELECTRONIC CAM TYPE ROTARY CUTTER CONTROL AND CONTROL DEVICE THEREFOR

TECHNICAL FIELD

The present invention relates to a method of generating the reverse rotation preventing electronic cam curve of an electronic cam type rotary cutter control and a control apparatus thereof.

BACKGROUND ART

As a conventional electronic cam type rotary cutter control method, for example, "an electronic cam type rotary cutter control method and an electronic cam curve generating method" has been disclosed in JP-A-2000-198094 publication (Patent Document 1). As shown in FIG. 6, an electronic cam curve including a prediction over a next cycle is generated to control, by utilizing a servomotor, an apparatus for defining the motion of a specific portion in one cycle constituting a non-cutting section and a cutting section in a rotary cutter for continuously cutting a web-like paper or an iron plate flowing consecutively into a set length without carrying out a rest. In this case, an electronic cam curve is represented by a speed pattern in FIG. 8(*a*) and a position pattern in FIG. 8(*b*), and a section (2)=T1→T2=T12 indicates the non-cutting section and a section (3)=T2→T3=T23 indicates the cutting section, and a position curve in FIG. 8(*b*) is represented by a cubic, and the position curve is differentiated so that a speed curve is represented by a quadric shown in FIG. 8(*a*).

Moreover, a cam curve in this case can automatically correspond, in an identical algorithm, to the case in which a cutting length is greater than the circumference of a cutter and the case in which it is smaller than the circumference.

In an electronic cam control to be carried out by using the cam curves for a speed and a position, as shown in FIG. 6, a pulse is fetched from a measure ring and roll 2 for detecting the amount of travel of a processed product such as a paper or an iron plate and an integration is carried out by means of a counter A15. Consequently, a phase θ in one cycle which has a maximum value of a pulse amount θM corresponding to a cutting length is repetitively obtained by a triangular wave generating circuit 17. The phase θ is input to a position pattern generating circuit 21 and a speed pattern generating circuit 19 corresponding to one cycle based on the cam curve so that a position command and a speed command are obtained every minute. Referring to the position command, when one cycle is ended, the maximum value of the position of the cycle (the amount of the rotating pulse of a servomotor 3 corresponding to a cutting length) is added so that a rotary cutter is controlled to be continuously rotated in the same direction.

For the position command thus generated, a feedback control is carried out based on a pulse count value sent from PG4 of the servomotor 3 and a position control is executed in order to cause a position deviation to approximate to zero, and an electronic cam control is thus performed every minute. On the other hand, referring to a speed pattern, an output from the speed pattern generating circuit 19 is multiplied by a speed obtained by a differentiating circuit 16 so as to be used for a feedforward corresponding to the running speed of an actual processed product, thereby enhancing a follow-up property.

In the conventional art, however, when the cutting length is caused to be extremely greater than the circumference of a cutter, the degree of a decrease in a quadratic curve in a non-cutting section in a speed pattern is increased so that a section in which the speed pattern is minus as in a reverse rotating section is generated as shown in a speed pattern in case of a great length in FIG. 7(*a*). In some cases, consequently, the cutter roll carries out at least one reverse rotation. Therefore, there is a problem in that a mechanical trouble is made, that is, "an object to be cut crashes against a blade rotated reversely".

Therefore, it is an object of the invention to provide a reverse rotation preventing electronic cam curve generating method of an electronic cam type rotary cutter control and a control apparatus thereof in which such a speed pattern as not to be minus is previously formed and the stoppage of a cutter and the interruption of an operation can be prevented also in case of a very great cutting length, the reverse rotation of the cutter can be prevented, and a mechanical trouble that an object to be cut crashes against a blade rotated reversely can be avoided.

DISCLOSURE OF THE INVENTION

In order to achieve the object, a first aspect of the invention is directed to a reverse rotation preventing electronic cam curve generating method of an electronic cam type rotary cutter control which prevents a reverse rotation of a rotary cutter when a cutting length is great, wherein a critical cutting length $L_{jag}$ from which an electronic cam curve passing through a point having an acceleration of 0 and a speed of 0 is obtained is previously calculated by setting a rotor diameter r of the rotary cutter, the number of blades M provided at regular intervals on a rotor, synchronizing speed coefficients $\beta_1$ and $\beta_2$ for regulating synchronizing speeds in cutting, and synchronizing angles $\theta_1$ and $\theta_2$ and is compared with a set cutting length $L_{set}$ of a processed product which is set by an operator, and an electronic cam curve pattern for preventing a reverse rotation is generated to carry out a reverse rotation preventing control when the set cutting length $L_{set}$ is greater.

According to the reverse rotation preventing electronic cam curve generating method of an electronic cam type rotary cutter control, the cutting length $L_{jag}$ in which the rotary cutter is reversely rotated is previously obtained by a calculation, and such an electronic cam curve as to avoid the reverse rotation is created to carry out a control when the cutting length $L_{set}$ of a workpiece is greater than the cutting length $L_{jag}$. Therefore, the reverse rotation of the cutter can be automatically prevented perfectly.

Moreover, a second aspect of the invention is characterized in that the critical cutting length $L_{jag}$ is obtained by the following equation based on the rotor diameter r, the number of blades M, the synchronizing speed coefficients $\beta_1$ and $\beta_2$, and the synchronizing angles $\theta_1$ and $\theta_2$.

$$\theta_{cut} = \frac{2\pi}{M}$$

$$L_{jag} = r\frac{\theta_{out} - \theta_1 - \theta_2 + \left\{\frac{3}{8}(\beta_1 + \beta_2) - \frac{1}{4}\sqrt{\beta_1\beta_2}\right\}\cdot\left(\frac{\theta_1}{\beta_1} + \frac{\theta_2}{\beta_2}\right)}{\frac{3}{8}(\beta_1 + \beta_2) - \frac{1}{4}\sqrt{\beta_1\beta_2}}$$

According to the reverse rotation preventing electronic cam curve generating method of an electronic cam type rotary cutter control, it is possible to accurately calculate a critical cutting length.

Furthermore, a third aspect of the invention is characterized in that when a result of the comparison of the critical cutting length $L_{jag}$ with the set cutting length $L_{set}$ is $L_{jag}>L_{set}$ or $L_{jag}<L_{set}$, an electronic cam curve pattern for preventing a reverse rotation is created by setting the following parameter: when $L_{jag}>L_{set}$ is set, $$T_{12} = \frac{T_C - T_{01} - T_{45}}{2}$$

$$T_{23} = 0$$

$$T_{34} = \frac{T_C - T_{01} - T_{45}}{2}$$

$$\omega_1 = \frac{2\pi}{T_{12} + T_{34}}$$

$$\omega_2 = \frac{\pi}{T_{12} + T_{34}}$$

$$A = A$$

and when $L_{jag}<L_{set}$ is set, $$\omega_1 = \frac{2\pi}{T_{jag}}$$

$$\omega_2 = \frac{\pi}{T_{jag}}$$

$$T_{12} = \frac{\pi - \alpha}{\omega_2}$$

$$T_{34} = T_{jag} - T_{12}$$

$$T_{23} = T_C - T_{01} - T_{12} - T_{34} - T_{45}$$

$$A = A_{jag}$$

According to the reverse rotation preventing electronic cam curve generating method of an electronic cam type rotary cutter control, it is possible to freely generate an optional pattern without changing an algorithm including an electronic cam curve pattern to avoid a reverse rotation by simply changing the six parameters in the above equations.

Moreover, a fourth aspect of the invention is characterized in that correction coefficients A and $A_{jag}$ of a speed function and a position function, $T_{jag}$ corresponding to $L_{jag}$, and as top phase angle α are obtained as the correction coefficient $A_{jag}$ for generating an electronic cam curve passing through a point having an acceleration of 0 and a speed of 0;

$$A_{jag} = -V_L\left(\frac{\beta_1 + \beta_2}{8r} + \frac{\sqrt{\beta_1\beta_2}}{4r}\right)$$

the correction coefficient A from a cutting length set to an operation panel;

$$A = V_L\frac{\theta_{cut} - \theta_1 - \theta_2 - \frac{\beta_1 + \beta_2}{2r}\left(L_{set} - \frac{r\theta_1}{\beta_1} - \frac{r\theta_2}{\beta_2}\right)}{L_{set} - \frac{r\theta_1}{\beta_1} - \frac{r\theta_2}{\beta_2}}$$

and $T_{jag}\cdot\alpha$ when a value set to $L_{set}$ is equal to $L_{jag}$.

$$T_{jag} = \frac{L_{jag} - r\left(\frac{\theta_1}{\beta_1} + \frac{\theta_2}{\beta_2}\right)}{V_L}$$

$$\alpha = \mathrm{Tan}^{-1}\left\{\frac{\sqrt{\left(\beta_1 + \beta_2 + 2\sqrt{\beta_1\beta_2}\right)^2 - (\beta_1 - \beta_2)^2}}{\beta_1 - \beta_2}\right\}$$

According to the reverse rotation preventing electronic cam curve generating method of an electronic cam type rotary cutter control, it is possible to create, as an effective command, such an electronic cam curve pattern as to prevent the reverse rotation of a cutter by using data on an actual cutter.

Furthermore, a fifth aspect of the invention is characterized in that the electronic cam curve divides one cutting and control cycle to be a reference into a large number of sections, and a speed function pattern and a position function pattern which are represented by an approximate equation through a trigonometric function for each of the sections are calculated in an identical algorithm respectively and a whole synthesis and generation is thus carried out.

According to the reverse rotation preventing electronic cam curve generating method of an electronic cam type rotary cutter control, one cutting cycle period $T_c$ to be the control unit of a controller is subdivided (for example, divided into five parts of 1 to 5 sections), and both the speed function and the position function are calculated for each of the sections by using a trigonometric function approximate equation to wholly carry out a synthesis, thereby generating an electronic cam curve pattern. By a simple and rapid calculation in which an algorithm does not need to be changed, therefore, it is possible to draw a smooth electronic cam curve pattern without generating any shock due to a change in an acceleration including an electronic cam curve pattern for preventing a reverse rotation.

Moreover, a sixth aspect of the invention is characterized in that the critical cutting length $L_{jag}$ is determined by one calculation According to the reverse rotation preventing electronic cam curve generating method of an electronic cam type rotary cutter control, in the case in which the critical cutting length $L_{jag}$ is to be obtained, it is not necessary to carry out a large number of calculations by trial and error to reciprocatively search for a prediction region in which it seems that a reverse rotation is caused and the critical cutting length $L_{jag}$ can be obtained instantly.

Furthermore, a seventh aspect of the invention is directed to an electronic cam type rotary cutter control apparatus having a counter for pulse counting an amount of movement of a workpiece from a measure roll PG of a mechanical apparatus including a measure roll, a cutter roll and a feed roll and serving to carry out a work for cutting the workpiece, a differentiating circuit for differentiating the count value to calculate a moving speed of the workpiece and to output the moving speed to a multiplier, thereby constituting a feedforward, a triangular wave generator for converting the count value into a triangular wave having an amplitude in a certain amount, a speed function generator for generating a cam curve speed pattern by a correction output of the triangular wave generator, a position function generator for generating a cam curve position pattern from the correction output of the triangular wave generator, a position loop constituting a feedback control based on the correction output of the position function generator and an amount of movement of a motor, and a speed controller for A/D converting and inputting a speed feedforward output of the multiplier and an output of the position loop and reading a value of the motor PG, thereby controlling a speed of the motor, and serving to prevent a reverse rotation of a rotary cutter when a cutting length of the workpiece is great, the apparatus comprising an electronic cam curve parameter setting unit having an operator unit for inputting a set cutting length $L_{set}$ to a comparator and a cutter roll radius r, the number of blades M, synchronizing speed coefficients $\beta_1$ and $\beta_2$ and synchronizing angles $\theta_1$ and $\theta_2$ to a first calculator, the first calculator for calculating a critical cutting length $L_{jag}$ based on a value input from the operator unit, the comparator for comparing the cutting length $L_{jag}$ thus calculated with the set cutting length $L_{set}$, a second calculator for setting A=A and calculating and outputting each of parameters of $T_{12}$, $T_{23}$, $T_{34}$, $\omega_1$ and $\omega_2$ in case of $L_{jag}>L_{set}$ and setting $A=A_{jag}$ and calculating and outputting each of the parameters of $\omega_1$, $\omega_2$, $T_{12}$, $T_{34}$ and $T_{23}$ in case of $L_{jag}<L_{set}$ based on a result of the comparison carried out by the comparator, and a setting unit for carrying out a write to the speed function generator and the position function generator in order to generate an electronic cam curve for preventing a reverse rotation based on each of the parameters output from the second calculator.

According to the electronic cam type rotary cutter control apparatus, it is possible to constitute a control apparatus for executing the operations of the cutter reverse rotation preventing method according to the first to sixth aspects of the invention by the operator unit, the first and second calculators, the comparator and the setting unit.

Figure 1A:
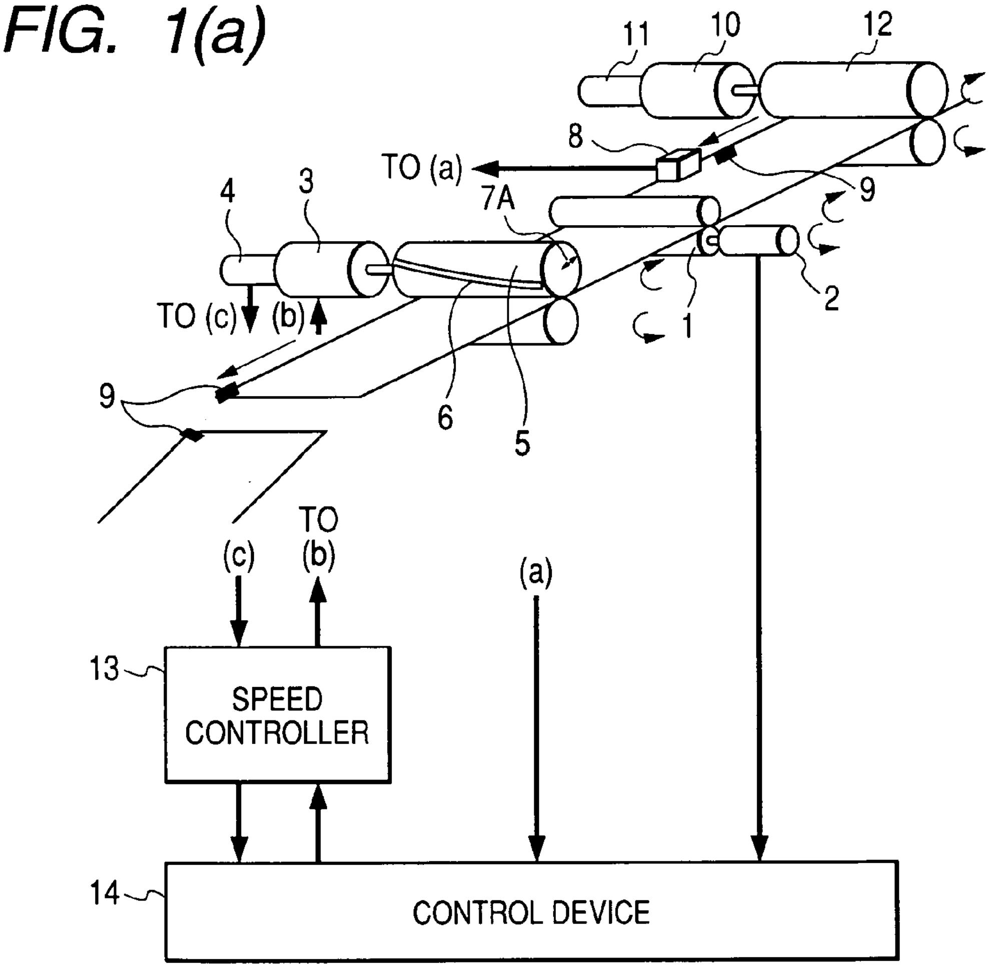
FIGS. 1A–1B are views showing the structure of a rotary cutter machine to which a reverse rotation preventing electronic cam curve generating method according to an embodiment of the invention is applied.

In the drawings, 1 denotes a measure roll, 2 denotes a measure roll PG, 3 denotes a motor A, 4 denotes a motor PGA, 5 denotes a cutter roll, 6 denotes a cutter, 7A denotes a cutter radius r, 7B denotes a synchronizing angle 1, 7C denotes a synchronizing angle 2, 7D denotes a workpiece feeding speed, 8 denotes a mark sensor, 9 denotes a cutting mark, 10 denotes a motor B, 11 denotes a motor PGB, 12 denotes a feed roll, 13 denotes a speed controller, 14 denotes a control device, 15 denotes a counter A, 16 denotes a differentiating circuit, 17 denotes a triangular wave generator, 18 denotes an adder A, 19 denotes a speed function generator, 20 denotes a multiplier, 21 denotes a position function generator, 22 denotes an adder B, 23 denotes a comparator, 24 denotes a PI, 25 denotes an adder C, 26 denotes a D/A, 27 denotes a counter B, 28 denotes an electronic cam curve parameter setting unit, 29 denotes an operator unit, 30 denotes a calculator A, 31 denotes a comparator, 32 denotes a calculator B, and 33 denotes a setting unit.

BEST MODE FOR CARRYING OUT THE INVENTION

Next, an embodiment of the invention will be described with reference to the drawings.

Figure 1B:
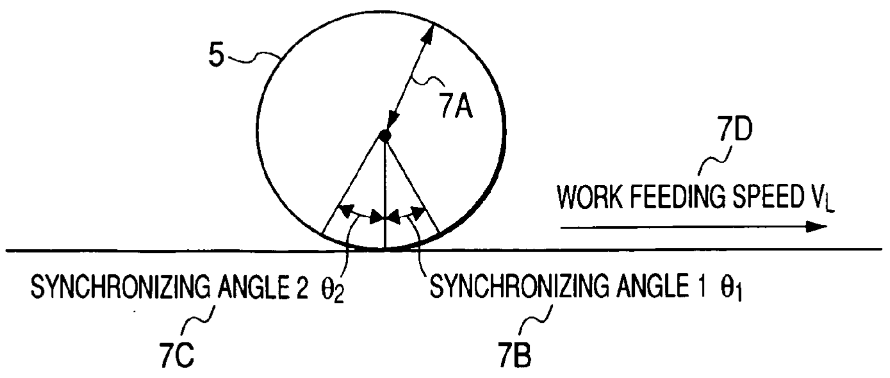

FIG. 1 is a view showing the structure of a rotary cutter machine to which a reverse rotation preventing electronic cam curve generating method according to an embodiment of the invention is applied.

In FIG. 1, FIG. 1(*a*) is a view showing the structure of a rotary cutter machine and FIG. 1(*b*) is a view for explaining a cutter roll. Referring to the machine in FIG. 1(*a*), a machine apparatus constituted by a measure roll 1, a cutter roll 5 and a feed roll 12 is provided with a measure roll PG2, a motor A3, a motor PG4, a mark sensor 8, a motor B10, a motor PG11, a speed controller 13, and a control device 14.

FIG. 1(*b*) is a sectional view showing the cutter roll 5, illustrating a cutter roll radius r7A, a workpiece feeding speed $V_L$7D, and a synchronizing angle 1$\theta_1$7B and a synchronizing angle 2$\theta_2$7C in a synchronizing section (a cutting section).

Figure 2:
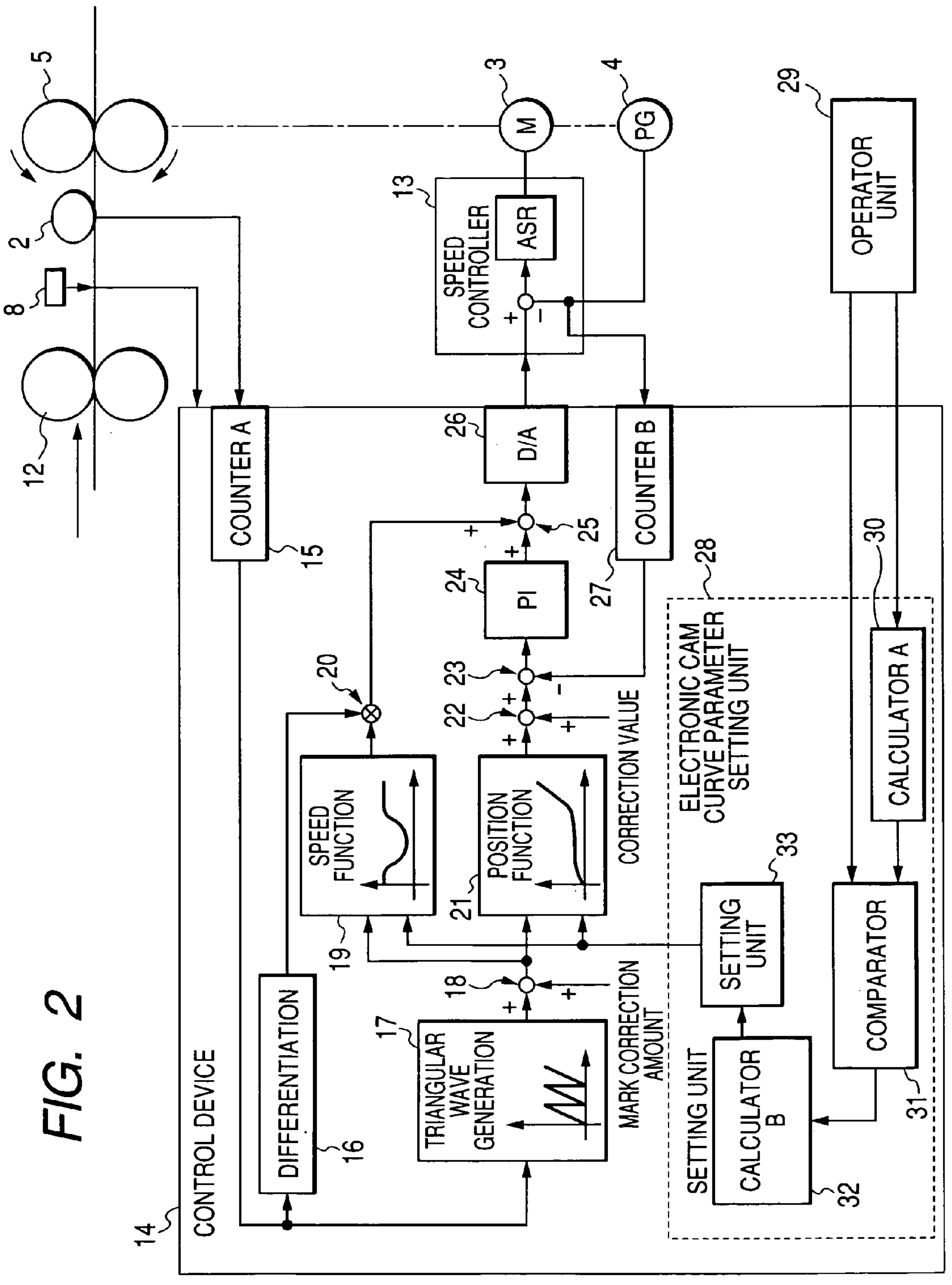
FIG. 2 is a control block diagram showing the rotary cutter illustrated in FIG. 1, FIGS. 3A–3B are graphs showing a speed function and position function pattern illustrated in FIG. 2, FIGS. 4A–4B are other graphs showing the speed function and position function pattern illustrated in FIG. 2.
Figure 6:
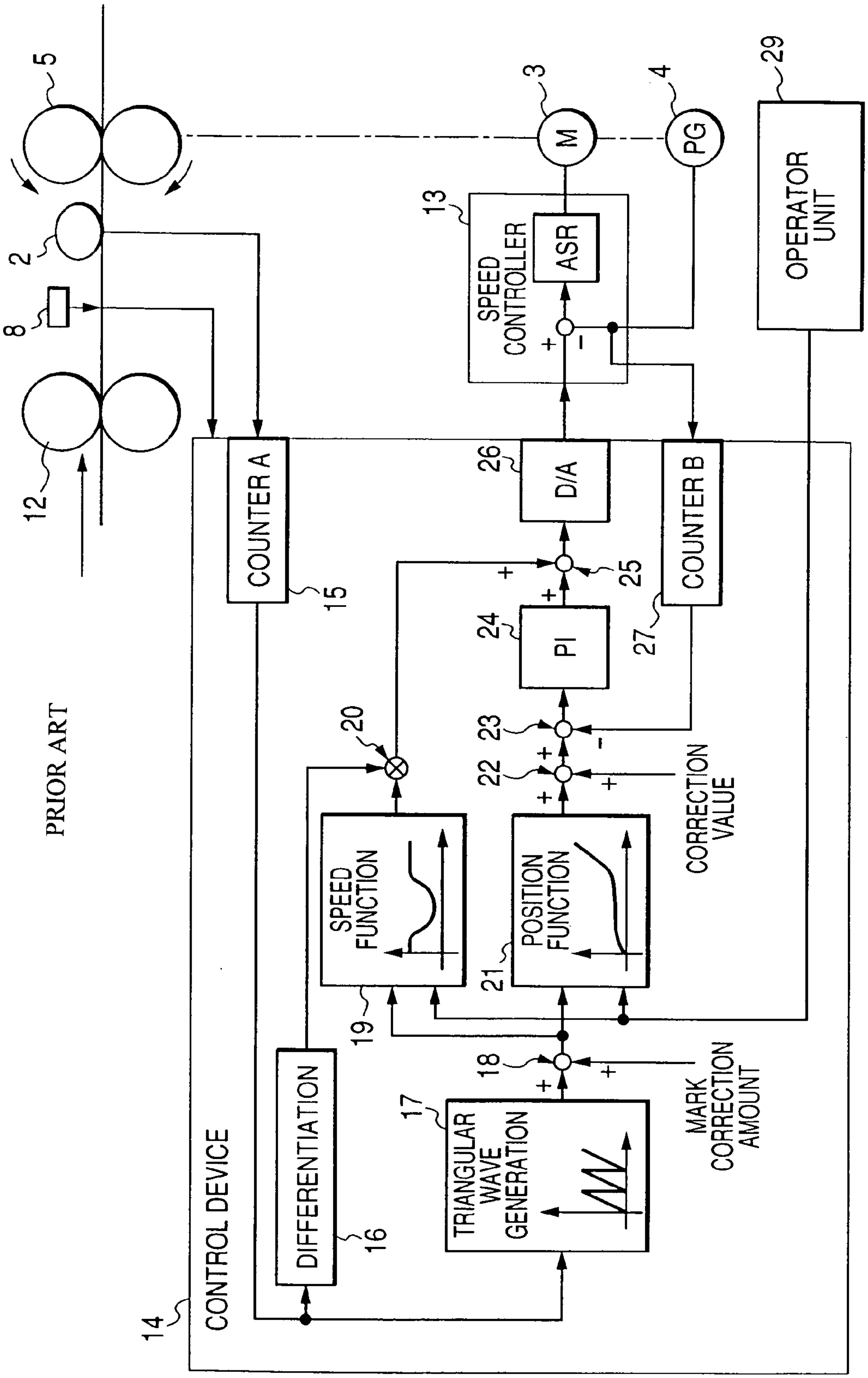
FIG. 6 PRIOR ART
FIG. 6 is a block diagram showing a conventional rotary cutter control device.
Figure 7A:
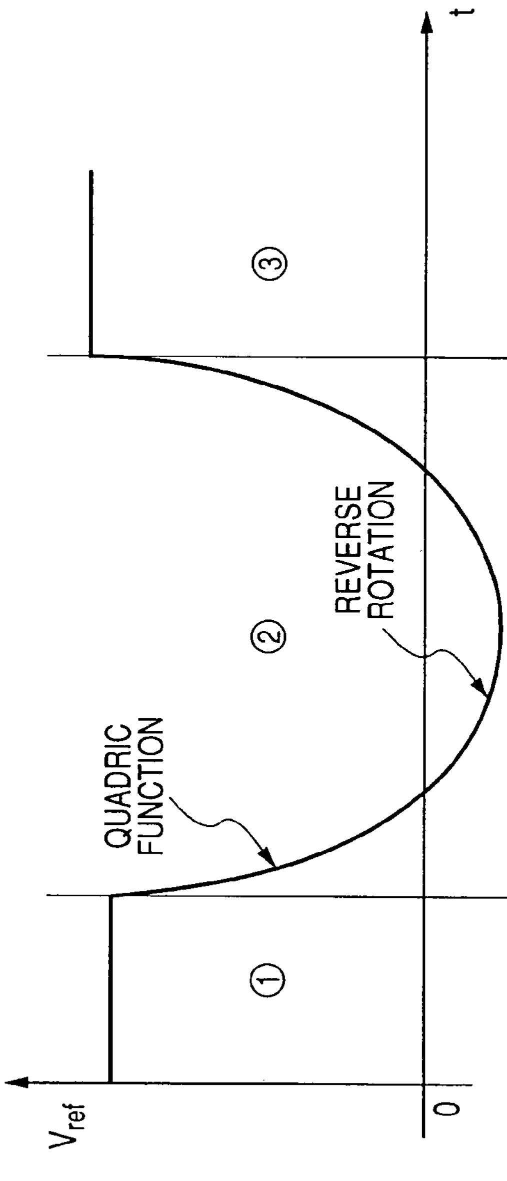
FIG. 7(a) PRIOR ART
FIGS. 7A–7B are graphs showing a speed function and position function pattern illustrated in FIG. 6, and FIGS. 8A–8B are other graphs showing the speed function and position function pattern illustrated in FIG. 6.
Figure 7B:
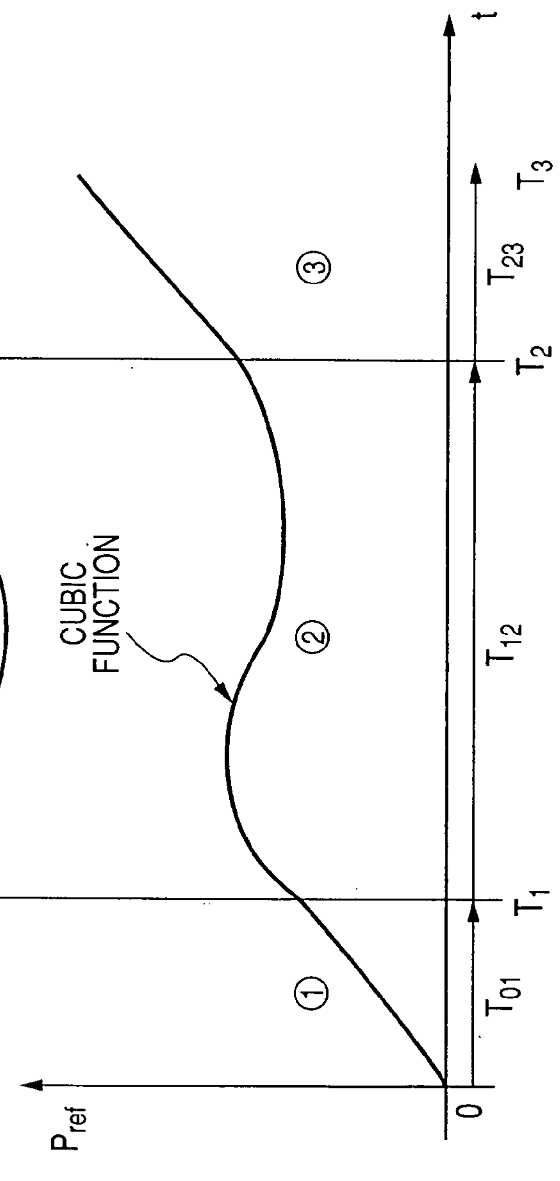
FIG. 7(b) PRIOR ART
Figure 8A:
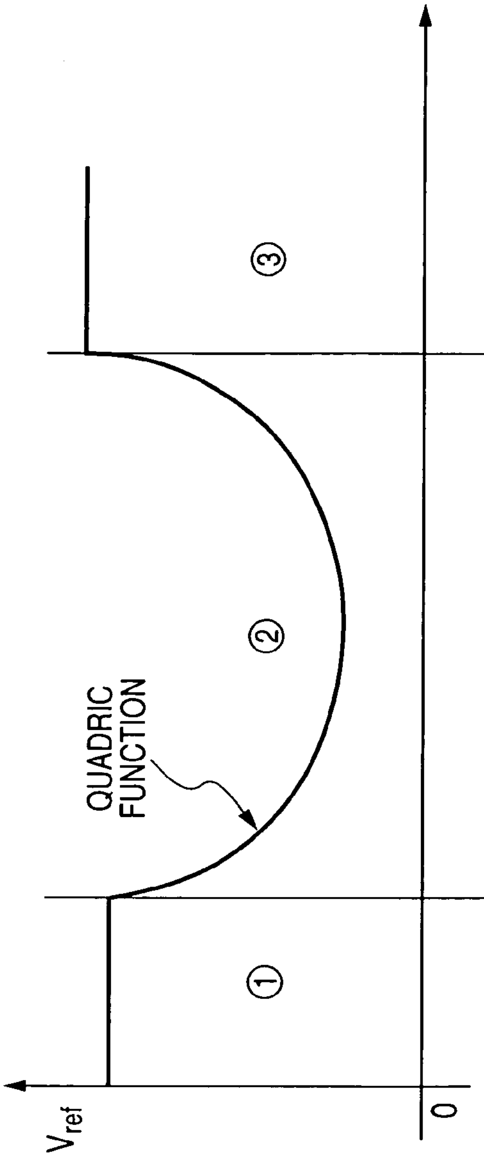
Figure 8B:
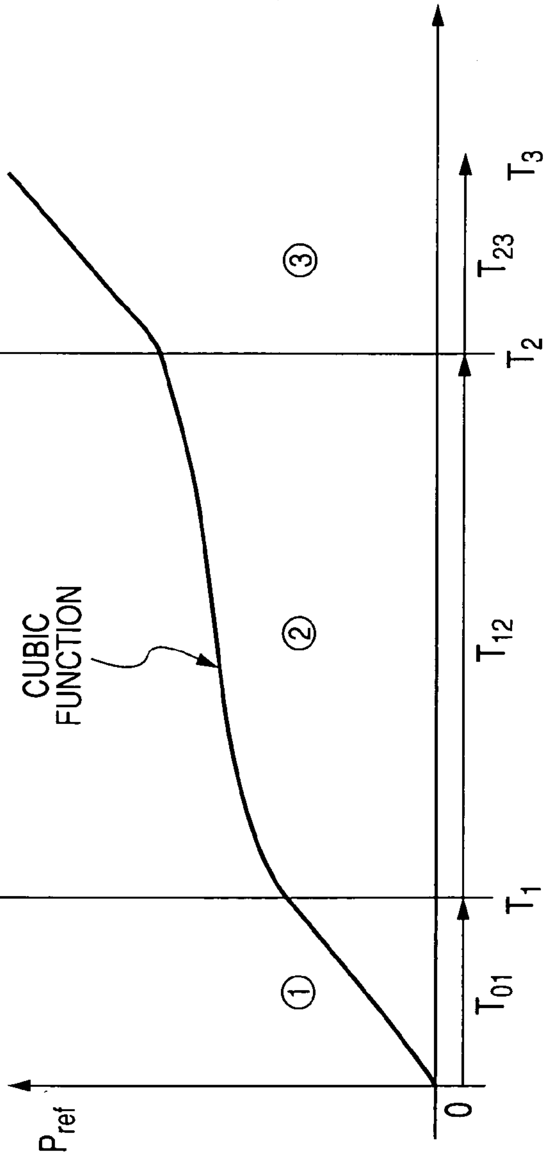

In FIG. 2, the control device 14 includes a counter A15, a differentiating circuit 16, a triangular wave generating circuit 17, an adder A18, a speed function 19, a multiplier 20, a position function 21, an adder B22, a comparator 23, a PI 24, an adder C25, an A/D converter 26, a counter B27, an operator unit 29, and an electronic cam curve parameter setting unit 28. Each block itself in a structure from which the operator unit 29 and the electronic cam curve parameter setting unit 28 are omitted is identical to that in the structure of FIG. 6 according to the conventional art. As a new structure, the electronic cam curve parameter setting unit 28 and the operator unit 29 are added. The electronic cam curve parameter setting unit 28 is constituted by a calculator A30, a comparator B31, a calculator B32 and a setting unit 33.

Next, an operation will be described.

The counter A15 carries out a pulse count over the amount of movement of the workpiece from the measure roll PG2, and outputs a value thus obtained to the differentiating circuit 16 and the triangular wave generating circuit 17. The differentiating circuit 16 differentiates the value received from the counter A15 and calculates the moving speed of the workpiece, and outputs the moving speed to the multiplier 20. Moreover, the triangular wave generating circuit 17 converts the value received from the counter A15 into a triangular wave having an amplitude in a certain amount (for example, θM corresponding to a cutting length) and then outputs the triangular wave to the adder A18. The adder A18 adds a mark correction amount based on the output of the triangular wave generating circuit 17 and the detected value of the line mark sensor 8 and then outputs a value thus obtained to the speed function 19 and the position function 21. The speed function 19 outputs a speed pattern corresponding to the output of the adder A18 to the multiplier 20, and the multiplier 20 multiplies the output of the differentiating circuit 16 by that of the speed function 19 and then outputs a value thus obtained to the adder 25. Thus, a so-called feedforward is carried out.

On the other hand, the position function 21 outputs a position pattern corresponding to the output of the adder A18 to the adder B22, and the adder B22 adds the position pattern output of the position function 21 to a correction value and then outputs a value thus obtained to the comparator 23, and the comparator 23 compares the output of the adder B22 with the motor moving amount (the value of the motor PG4) of the counter B27 and then outputs a difference to the PI 24. Thus, a so-called position loop control is constituted. The PI 24 calculates a correction value from the difference of the comparator 23 and then outputs the correction value to the adder C25, and the adder C25 adds the feedforward output of the multiplier 20 to the correction value of the PI 24 and then outputs a value thus obtained to the D/A converter 26. The D/A converter 26 outputs, to the speed controller 13, a voltage value which is proportional to the output of the adder C25, and the speed controller 13 reads the value of the motor PG4 and controls the motor A3. The counter B27 measures the amount of movement of a cutter roll which is detected by the motor PG4 and outputs the amount to the comparator 23.

Figure 3A:
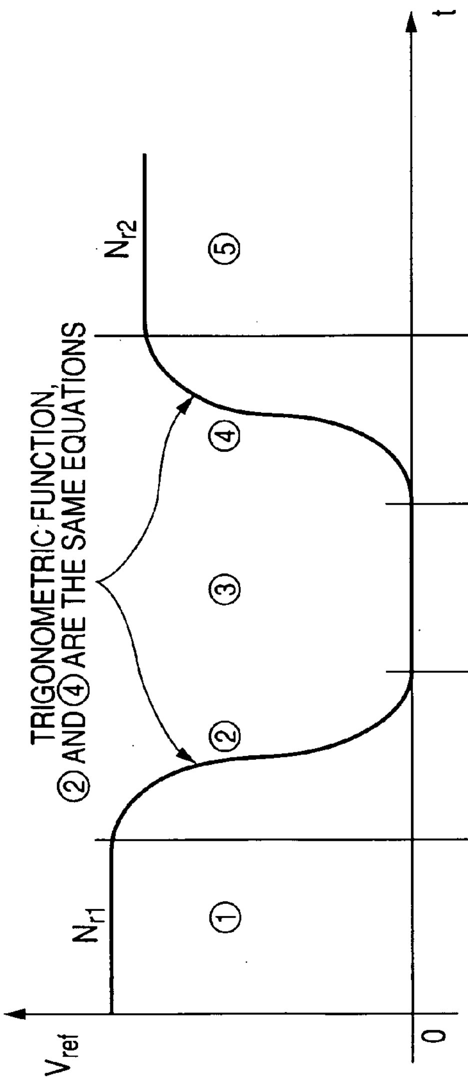
Figure 3B:
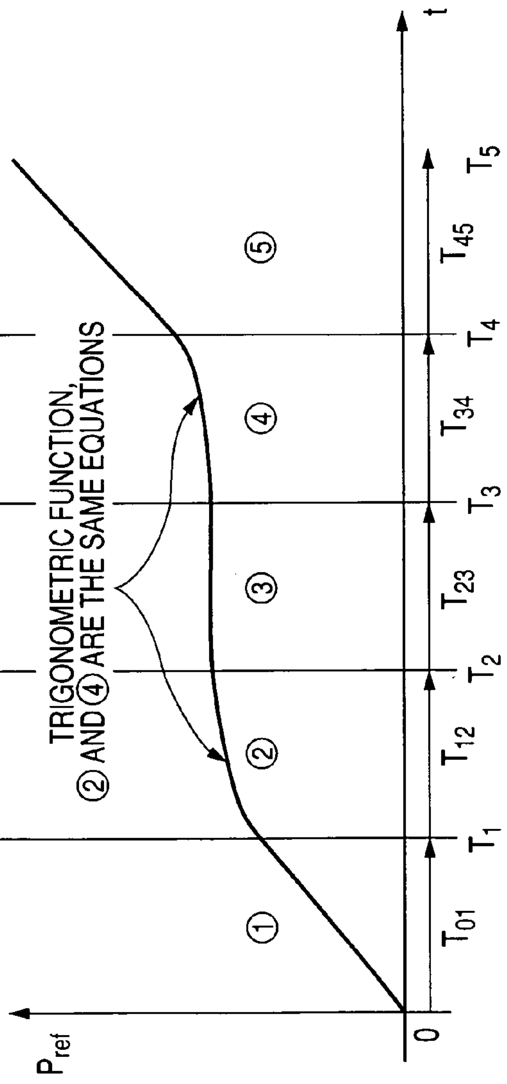
Figure 4A:
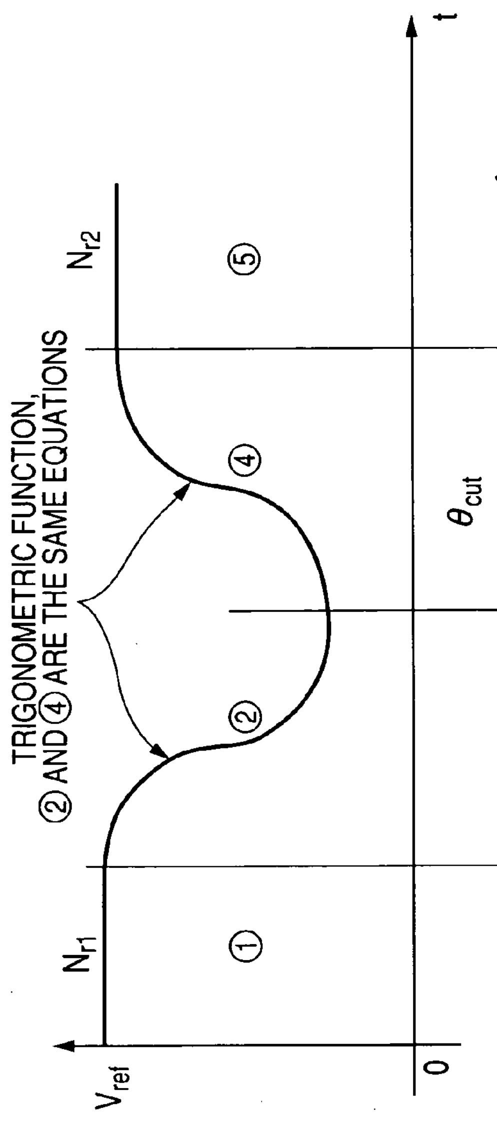
Figure 4B:
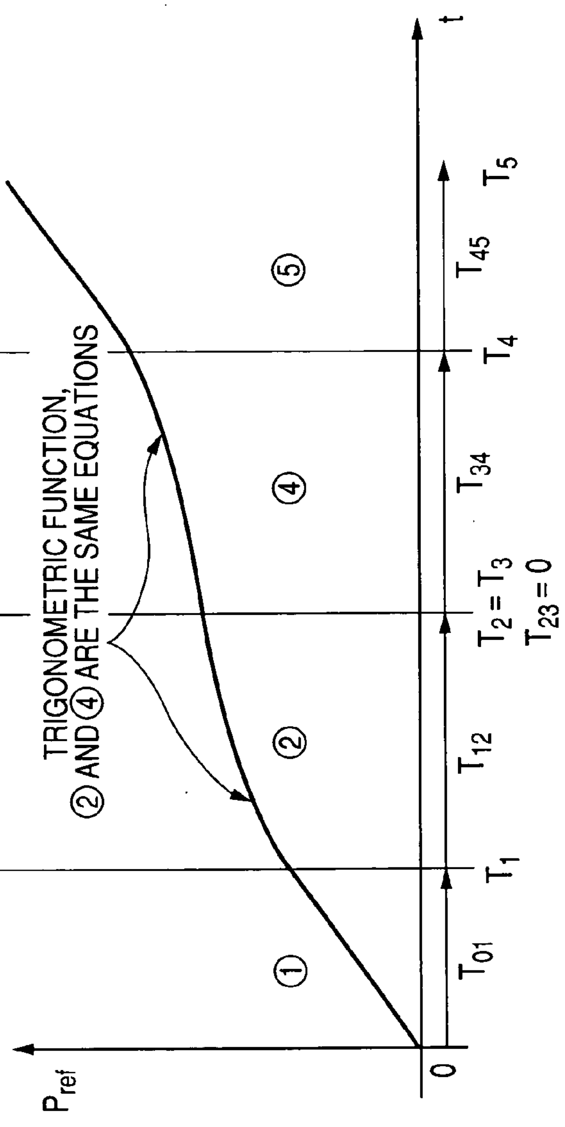

Referring to an electronic cam curve generating algorithm to be previously created as in graphs for a speed function and a position function shown in FIG. 3 in the speed function 19 and the position function 21, a position curve is represented in a curve expression based on a cubic and a speed curve is represented in a curve expression based on a quadric, and a calculation is carried out with a rough division into a section (2) (a non-cutting section) and a section (3) (a cutting section) in the Patent Document 1 according to the conventional example, while the speed and position cam curves are represented in well-known curve expressions based on a cubic approximate expression having a simple calculation which will be described below in the embodiment. Referring to each section display, a subdivision into five sections of (1) to (5) to be T1 to T5 is carried out as shown in FIGS. 3 and 4 differently from the conventional example in which a division into three sections of (1) to (3) to be T1 to T3 is carried out for a display. Thus, a calculation is carried out by an equation for each of the sections (1), (2), (3), (4) and (5) and a whole synthesis is executed. Consequently, an improvement can be performed in order to obtain a smooth cam curve.

$$T_1 = T_{01}$$
$$T_2 = T_{01} + T_{12}$$
$$T_3 = T_{01} + T_{12} + T_{23}$$
$$T_4 = T_{01} + T_{12} + T_{23} + T_{34}$$
$$T_5 = T_{01} + T_{12} + T_{23} + T_{34} + T_{45}$$

$$T_0 \leqq t < T_1 \text{ section} \tag{1}$$
$$V_{ref} = N_{rl}$$
$$P_{ref} = N_{rl}t$$

$$T_1 \leqq t < T_2 \text{ section} \tag{2}$$
$$V_{ref} = A[1 - \cos\{\omega_1(t - T_1)\}] + N_{rl} - \frac{N_{rl} - N_{r2}}{2}[1 - \cos\{\omega_2(t - T_1)\}]$$
$$P_{ref} = A\left[t - T_1 - \frac{1}{\omega_1}\sin\{\omega_1(t - T_1)\}\right] + N_{rl}(t - T_1) - \frac{N_{rl} - N_{r2}}{2}\left[t - T_1 - \frac{1}{\omega_2}\sin\{\omega_2(t - T_1)\}\right] + N_{rl}T_1$$

$$T_2 \leqq t < T_3 \text{ section} \tag{3}$$
$$V_{ref} = 0$$
$$P_{ref} = A\left[T_2 - T_1 - \frac{1}{\omega_1}\sin\{\omega_1(T_2 - T_1)\}\right] + N_{rl}(T_2 - T_1) - \frac{N_{rl} - N_{r2}}{2}\left[T_2 - T_1 - \frac{1}{\omega_2}\sin\{\omega_2(T_2 - T_1)\}\right] + N_{rl}T_1$$

$$T_3 \leqq t < T_4 \text{ section} \tag{4}$$
$$V_{ref} = A[1 - \cos\{\omega_1(t - T_3 + T_2 - T_1)\}] + N_{rl} - \frac{N_{rl} - N_{r2}}{2}[1 - \cos\{\omega_2(t - T_3 + T_2 - T_1)\}]$$
$$P_{ref} = A\left[t - T_3 + T_2 - T_1 - \frac{1}{\omega_1}\sin\{\omega_1(t - T_3 + T_2 - T_1)\}\right] + N_{rl}(t - T_3 + T_2 - T_1) - \frac{N_{rl} - N_{r2}}{2}\left[t - T_3 + T_2 - T_1 - \frac{1}{\omega_2}\sin\{\omega_2(t - T_3 + T_2 - T_1)\}\right]$$

$$T_4 \leqq t < T_5 \text{ section} \tag{5}$$
$$V_{ref} = N_{r2}$$
$$P_{ref} = N_{r2}(t - T_4) + A(T_4 - T_3 + T_2 - T_1) + N_{rl}(T_4 - T_3 + T_2 - T_1) - \frac{N_{rl} - N_{r2}}{2}(T_4 - T_3 + T_2 - T_1) + N_{rl}T_1$$

wherein it is assumed that various parameters of $T_{01}$, $T_{12}$, $T_{23}$, $T_{34}$, $T_{45}$, $\omega_1$, $\omega_2$, $N_{r1}$, $N_{r2}$ and A can be set optionally. $\omega_1$ and $\omega_2$ represent an angular speed and A represents a correction coefficient which will be described below.

When the parameter $T_{23}$ has a value of 0, moreover, the sections (2) and (4) are linked together and the basic equation can be obtained as expressed in the following expression.

$$V_{ref} = A[1-\cos\{\omega_1(t-T_1)\}] + N_{r1} - \frac{N_{r1}-N_{r2}}{2}[1-\cos\{\omega_2(t-T_1)\}]$$

$$P_{ref} = A\left[t-T_1-\frac{1}{\omega_1}\sin\{\omega_1(t-T_1)\}\right] + N_{r1}(t-T_1) - \frac{N_{r1}-N_{r2}}{2}\left[t-T_1-\frac{1}{\omega_2}\sin\{\omega_2(t-T_1)\}\right] + N_{r1}T_1$$

In other words, the terms of the parameters are identical to $(t-T_3+T_2-T_1)\rightarrow(t-T_1)$ for both $V_{ref}$ and $P_{ref}$ in the section (4) based on the condition of $T_2=T_3=0$, and they are connected through an identical equation by eliminating the section (3). Consequently, a control is carried out to draw an improved graph without reverse rotation as shown in FIG. 4.

More specifically, the operator unit 29 outputs a cutting length $L_{set}$ to the comparator 31, and to the calculator A30, other parameters are output, such as a cutter roll radius r, the number of blades M provided at regular intervals on a rotor, synchronizing speed coefficients $\beta_1$ and $\beta_2$ for regulating synchronizing speeds in cutting (coefficients indicated as $N_{r1}=\beta_1 V_L/r$ and $N_{r2}=\beta_2 V_L/r$ which will be described below), and synchronizing angles $\theta_1$ and $\theta_2$. Next, the calculator A30 processes the following calculation by using the cutter roll radius r and the number of blades M provided at regular intervals on a rotor, the synchronizing speed coefficients $\beta_1$ and $\beta_2$ for regulating synchronizing speeds in cutting, and the synchronizing angles $\theta_1$ and $\theta_2$ to obtain a cutting length $L_{jag}$ from which an electronic cam curve passing through a point having an acceleration of 0 and a speed of 0 is acquired (thus, a critical cutting length in which a reverse rotation is generated is obtained).

$$\theta_{cut} = \frac{2\pi}{M}$$

$$L_{jag} = r\frac{\theta_{out}-\theta_1-\theta_2+\left\{\frac{3}{8}(\beta_1+\beta_2)-\frac{1}{4}\sqrt{\beta_1\beta_2}\right\}\cdot\left(\frac{\theta_1}{\beta_1}+\frac{\theta_2}{\beta_2}\right)}{\frac{3}{8}(\beta_1+\beta_2)-\frac{1}{4}\sqrt{\beta_1\beta_2}}$$

Further, the calculator A30 outputs the result of the calculation $L_{jag}$ to the comparator 31, where the comparator 31 compares the set cutting length $L_{set}$ received from the operator unit 29 with the cutting length $L_{jag}$ received from the calculator A30, and outputs the result of the comparison to the calculator B32, and the calculator B32 calculates the followings:

$$T_c = \frac{L_{set}}{V_L}$$

$$T_{01} = \frac{\theta_1}{N_{r1}}$$

$$T_{45} = \frac{\theta_2}{N_r}$$

$$N_{r1} = \frac{\beta_1 V_L}{r}$$

-continued $$N_{r2} = \frac{\beta_2 V_L}{r};$$

a correction coefficient $A_{jag}$ for generating an electronic cam curve passing through a point having an acceleration of 0 and a speed of 0, such as, $$A_{jag} = -V_L\left(\frac{\beta_1+\beta_2}{8r}+\frac{\sqrt{\beta_1\beta_2}}{4r}\right);$$

a correction coefficient A from a cutting length set to an operation panel, such as, $$A = V_L\frac{\theta_{cut}-\theta_1-\theta_2-\frac{\beta_1+\beta_2}{2r}\left(L_{set}-\frac{r\theta_1}{\beta_1}-\frac{r\theta_2}{\beta_2}\right)}{L_{set}-\frac{r\theta_1}{\beta_1}-\frac{r\theta_2}{\beta_2}},$$

and obtain $T_{jag}\cdot\alpha$ when a value set to $L_{set}$ is equal to $L_{jag}$, from the following equations.

$$T_{jag} = \frac{L_{jag}-r\left(\frac{\theta_1}{\beta_1}+\frac{\theta_2}{\beta_2}\right)}{V_L}$$

$$\alpha = \mathrm{Tan}^{-1}\left\{\frac{\sqrt{\left(\beta_1+\beta_2+2\sqrt{\beta_1\beta_2}\right)^2-(\beta_1-\beta_2)^2}}{\beta_1-\beta_2}\right\}$$

Next, the calculator B32 processes the followings, when $L_{set}$ is smaller than $L_{jag}$ as the result of the output from the comparator 31.

$$T_{12} = \frac{T_c-T_{01}-T_{45}}{2}$$

$$T_{23} = 0$$

$$T_{34} = \frac{T_c-T_{01}-T_{45}}{2}$$

$$\omega_1 = \frac{2\pi}{T_{12}+T_{34}}$$

$$\omega_2 = \frac{\pi}{T_{12}+T_{34}}$$

$$A = A$$

On the other hand, when $L_{set}$ is greater than $L_{jag}$ as the result output from the comparator 31, the calculator B32 processes the followings.

$$\omega_1 = \frac{2\pi}{T_{jag}}$$

$$\omega_2 = \frac{\pi}{T_{jag}}$$

-continued $$T_{12} = \frac{\pi - \alpha}{\omega_2}$$

$$T_{34} = T_{jag} - T_{12}$$

$$T_{23} = T_c - T_{01} - T_{12} - T_{34} - T_{45}$$

$$A = A_{jag}$$

Those results are output to the setting unit 33.

Figure 5:
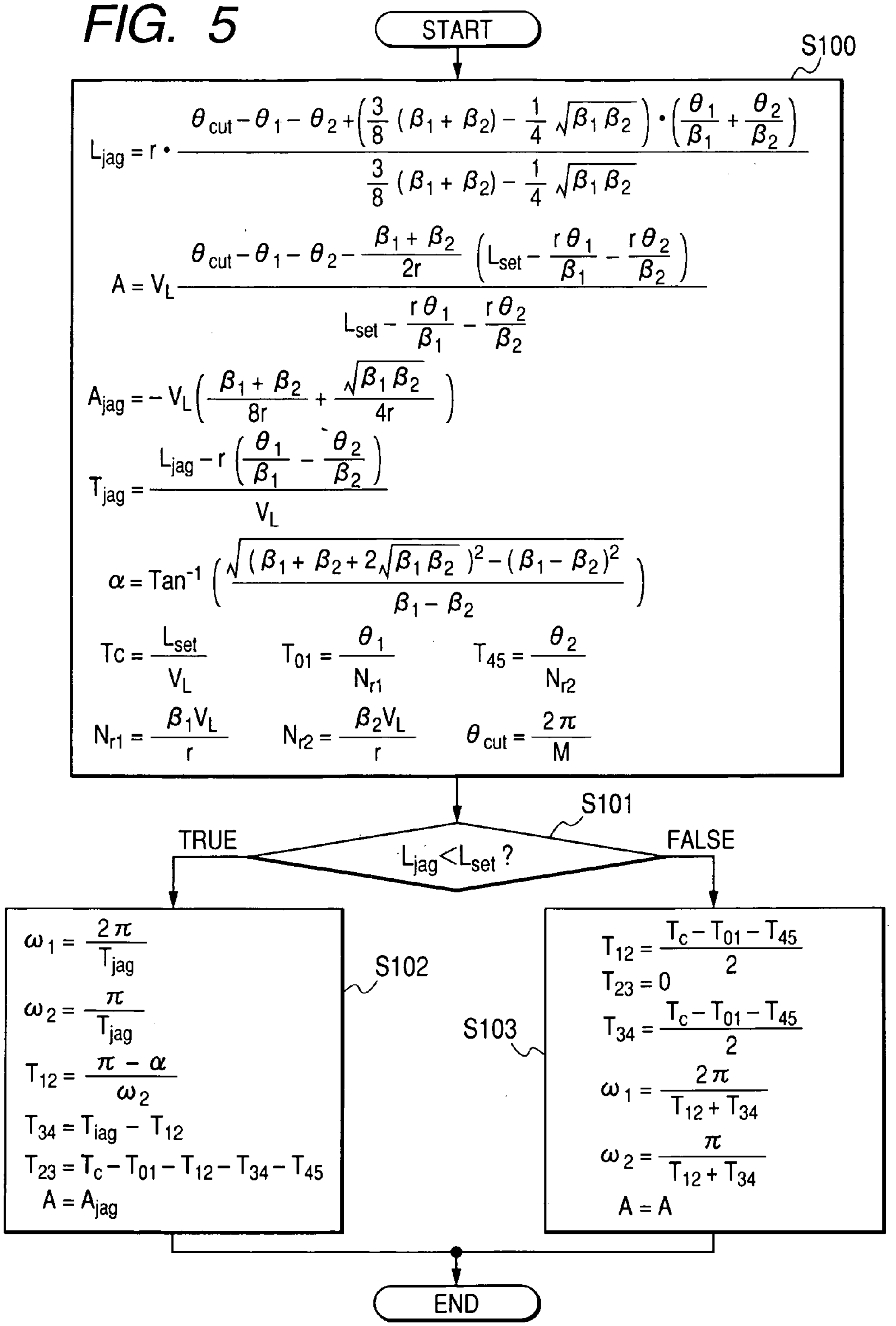
FIG. 5 is a flowchart showing the reverse rotation prevention processing of a control device illustrated in FIG. 2.

The processing can be also summarized based on a flowchart showing the processing of an electronic cam curve parameter setting unit shown in FIG. 5.

First of all, the calculator A30 calculates the critical cutting length $L_{jag}$, the correction coefficients A and $A_{jag}$, $T_{jag}$ and a (S100).

Next, the comparator 31 compares the cutting length $L_{jag}$ obtained at S100 with the set cutting length $L_{set}$ received from the operator unit 29 and decides whether $L_{jag}$ is smaller than $L_{set}$ or not (S101).

If the result of the comparison is true, the calculator B32 calculates the following equations and outputs results to the setting unit 33 (S102).

$$\omega_1 = 2\pi/T_{jag},$$

$$\omega_2 = \pi/T_{jag},$$

$$T_{12} = (\pi - \alpha)/\omega_2,$$

$$T_{34} = T_{jag} - T_{12},$$

$$T_{23} = T_c - T_{01} - T_{12} - T_{34} - T_{45}, \text{ and}$$

$$A = A_{jag}.$$

If the decision of S101 is false, the calculator B32 calculates the following equations and outputs results to the setting unit 33 (S103).

$$T_{12} = (T_c - T_{01} - T_{45})/2,$$

$$T_{23} = 0,$$

$$T_{34} = (T_c - T_{01} - T_{45})/2,$$

$$\omega_1 = 2\pi/(T_{12} + T_{34}),$$

$$\omega_2 = \pi/(T_{12} + T_{34}), \text{ and}$$

$$A = A.$$

Such a processing is carried out.

Thus, the setting unit 33 writes $T_{01}$, $T_{12}$, $T_{23}$, $T_{34}$, $T_{45}$, $N_{r1}$, $N_{r2}$, $\omega_1$, $\omega_2$ and A received from the calculator B32 to the speed function 19 and the position function 21 in a triangular wave generation loop-back timing, thereby obtaining short, long and reverse rotation preventing long electronic cam type rotary cutter electronic cam curves and carrying out a control. Consequently, it is possible to prevent a mechanical trouble in which the cutter roll carries out at least one reverse rotation and "an object to be cut crushes against a blade rotated reversely".

In the electronic cam curve according to the invention, moreover, no matter how long the cutting length $L_{set}$ set by an operator is, it is possible to prevent a reverse rotation by setting $L_{jag}$.

In the electronic cam curve according to the invention, furthermore, it is possible to carry out a calculation in an identical algorithm without requiring to change the basic algorithms of a speed function and a position function based on a trigonometric function approximate equation also in short, long and very long cutting which is longer than $L_{jag}$. Consequently, the calculation processing can be simplified so that a speed can be increased.

INDUSTRIAL APPLICABILITY

As described above, according to the invention, a critical cutting length $L_{jag}$ from which an electronic cam curve passing through a point having an acceleration of 0 and a speed of 0 is obtained is previously calculated by setting the rotor diameter of a rotary cutter, synchronizing speed correction coefficients $\beta_1$ and $\beta_2$, and synchronizing angles $\theta_1$ and $\theta_2$, and is compared with a cutting length $L_{set}$ set by an operator, thereby calculating the parameter of an electronic cam curve for preventing a reverse rotation when the set cutting length is greater and reflecting a position command and a speed command. Consequently, it is possible to obtain an advantage that a reverse rotation preventing electronic cam curve can be generated and a mechanical trouble that "both an object to be cut and a reversely rotated blade crash against each other" can be eliminated.

The invention claimed is:

1. A reverse rotation preventing electronic cam curve generating method of an electronic cam type rotary cutter control which prevents a reverse rotation of a rotary cutter when a cutting length is great, wherein a critical cutting length $L_{jag}$ from which an electronic cam curve passing through a point having an acceleration of 0 and a speed of 0 is obtained is previously calculated by setting a rotor diameter r of the rotary cutter, the number of blades M provided at regular intervals on a rotor, synchronizing speed coefficients $\beta_1$ and $\beta_2$ for regulating synchronizing speeds in cutting, and synchronizing angles $\theta_1$ and $\theta_2$ and is compared with a set cutting length $L_{set}$ of a processed product which is set by an operator, and an electronic cam curve pattern for preventing a reverse rotation is generated to carry out a reverse rotation preventing control when the set cutting length $L_{set}$ is greater.

2. The reverse rotation preventing electronic cam curve generating method of an electronic cam type rotary cutter control according to claim 1, wherein the critical cutting length $L_{jag}$ is obtained by an equation of:

$$\theta_{cut} = \frac{2\pi}{M}$$

$$L_{jag} = r\frac{\theta_{out} - \theta_1 - \theta_2 + \left\{\frac{3}{8}(\beta_1 + \beta_2) - \frac{1}{4}\sqrt{\beta_1\beta_2}\right\}\cdot\left(\frac{\theta_1}{\beta_1} + \frac{\theta_2}{\beta_2}\right)}{\frac{3}{8}(\beta_1 + \beta_2) - \frac{1}{4}\sqrt{\beta_1\beta_2}}$$

where r is a rotor diameter, M is the number of blades, $\beta_1$ and $\beta_2$ are the synchronizing speed coefficients, and $\theta_1$ and $\theta_2$ are the synchronizing angles.

3. The reverse rotation preventing electronic cam curve generating method of an electronic cam type rotary cutter control according to claim 1 or 2, wherein when a result of the comparison of the critical cutting length $L_{jag}$ with the set cutting length $L_{set}$ is $L_{jag} > L_{set}$ or $L_{jag} < L_{set}$, an electronic cam curve pattern for preventing a reverse rotation is created by setting the following parameter:

when $L_{jag}>L_{set}$ is set as, $$T_{12}=\frac{T_c-T_{01}-T_{45}}{2}$$

$$T_{23}=0$$

$$T_{34}=\frac{T_c-T_{01}-T_{45}}{2}$$

$$\omega_1=\frac{2\pi}{T_{12}+T_{34}}$$

$$\omega_2=\frac{\pi}{T_{12}+T_{34}}$$

$$A=A$$

and when $L_{jag}<L_{set}$ is set as, $$\omega_1=\frac{2\pi}{T_{jag}}$$

$$\omega_2=\frac{\pi}{T_{jag}}$$

$$T_{12}=\frac{\pi-\alpha}{\omega_2}$$

$$T_{34}=T_{jag}-T_{12}$$

$$T_{23}=T_C-T_{01}-T_{12}-T_{34}-T_{45}$$

$$A=A_{jag}.$$

4. The reverse rotation preventing electronic cam curve generating method of an electronic cam type rotary cutter control according to claim 3, wherein correction coefficients A and $A_{jag}$ of a speed function and a position function, $T_{jag}$ corresponding to $L_{jag}$, and a stop phase angle α are obtained as the correction coefficient $A_{jag}$ for generating an electronic cam curve passing through a point having an acceleration of 0 and a speed of 0 such as, $$A_{jag}=-V_L\left(\frac{\beta_1+\beta_2}{8r}+\frac{\sqrt{\beta_1\beta_2}}{4r}\right)$$

the correction coefficient A from a cutting length set to an operation panel, $$A=V_L\frac{\theta_{cut}-\theta_1-\theta_2-\frac{\beta_1+\beta_2}{2r}\left(L_{set}-\frac{r\theta_1}{\beta_1}-\frac{r\theta_2}{\beta_2}\right)}{L_{set}-\frac{r\theta_1}{\beta_1}-\frac{r\theta_2}{\beta_2}},\text{ and}$$

$T_{jag}\cdot\alpha$ when a value set to $L_{set}$ is equal to $L_{jag}$ from the following equation;

$$T_{jag}=\frac{L_{jag}-r\left(\frac{\theta_1}{\beta_1}+\frac{\theta_2}{\beta_2}\right)}{V_L}$$

-continued $$\alpha=\mathrm{Tan}^{-1}\left\{\frac{\sqrt{\left(\beta_1+\beta_2+2\sqrt{\beta_1\beta_2}\right)^2-(\beta_1-\beta_2)^2}}{\beta_1-\beta_2}\right\}.$$

5. The reverse rotation preventing electronic cam curve generating method of an electronic cam type rotary cutter control according to claim 1, wherein the electronic cam curve divides one cutting and control cycle to be a reference into a large number of sections, and a speed function pattern and a position function pattern which are represented by an approximate equation through a trigonometric function for each of the sections are calculated in an identical algorithm respectively and a whole synthesis and generation is carried out.

6. The reverse rotation preventing electronic cam curve generating method of an electronic cam type rotary cutter control according to claim 2, wherein the critical cutting length $L_{jag}$ is determined by one calculation.

7. An electronic cam type rotary cutter control apparatus having a counter for pulse counting an amount of movement of a workpiece from a measure roll PG of a mechanical apparatus including a measure roll, a cutter roll and a feed roll and serving to carry out a work for cutting the workpiece, a differentiating circuit for differentiating the count value to calculate a moving speed of the workpiece and to output the moving speed to a multiplier, thereby constituting a feedforward, a triangular wave generator for converting the count value into a triangular wave having an amplitude in a certain amount, a speed function generator for generating a cam curve speed pattern by a correction output of the triangular wave generator, a position function generator for generating a cam curve position pattern from the correction output of the triangular wave generator, a position loop constituting a feedback control based on the correction output of the position function generator and an amount of movement of a motor, and a speed controller for A/D converting and inputting a speed feedforward output of the multiplier and an output of the position loop and reading a value of the motor PG, thereby controlling a speed of the motor, and serving to prevent a reverse rotation of a rotary cutter when a cutting length of the workpiece is great, the apparatus comprising an electronic cam curve parameter setting unit having an operator unit for inputting a set cutting length $L_{set}$ to a comparator and a cutter roll radius r, the number of blades M, synchronizing speed coefficients $\beta_1$ and $\beta_2$ and synchronizing angles $\theta_1$ and $\theta_2$ to a first calculator, the first calculator for calculating a critical cutting length $L_{jag}$ based on a value input from the operator unit, the comparator for comparing the cutting length $L_{jag}$ thus calculated with the set cutting length $L_{set}$, a second calculator for setting A=A and calculating and outputting each of parameters of $T_{12}$, $T_{23}$, $T_{34}$, $\omega_1$ and $\omega_2$ in case of $L_{jag}>L_{set}$ and setting $A=A_{jag}$ and calculating and outputting each of the parameters of $\omega_1$, $\omega_2$, $T_{12}$, $T_{34}$ and $T_{23}$ in case of $L_{jag}<L_{set}$ based on a result of the comparison carried out by the comparator, and a setting unit for carrying out a write to the speed function generator and the position function generator in order to generate an electronic cam curve for preventing a reverse rotation based on each of the parameters output from the second calculator.

8. An electronic cam curve generating method comprising:

obtaining a critical cutting length $L_{jag}$ from which an electronic cam curve passing through a point having an acceleration of 0 and a speed of 0; and generating an electronic cam curve pattern for preventing a reverse rotation o carry out a reverse rotation preventing control when the set cutting length $L_{set}$ is greater than a predetermined value;

the critical length $L_{jag}$ being obtained by a sub-process comprising:

setting a rotor diameter r of the rotary cutter;

providing the number of blades M at regular intervals on a rotor;

synchronizing speed coefficients $\beta_1$ and $\beta_2$ for regulating synchronizing speeds in cutting, and synchronizing angles $\theta_1$ and $\theta_2$ and comparing with a set cutting length $L_{set}$ of a processed product which is set by an operator.

9. The electronic cam curve generating method of claim 8 wherein the critical cutting length $L_{jag}$ is obtained by an equation of:

$$\theta_{cut} = \frac{2\pi}{M}$$

$$L_{jag} = r\frac{\theta_{cut} - \theta_1 - \theta_2 + \left\{\frac{3}{8}(\beta_1 + \beta_2) - \frac{1}{4}\sqrt{\beta_1\beta_2}\right\}\cdot\left(\frac{\theta_1}{\beta_1} + \frac{\theta_2}{\beta_2}\right)}{\frac{3}{8}(\beta_1 + \beta_2) - \frac{1}{4}\sqrt{\beta_1\beta_2}}$$

where r is a rotor diameter, M is the number of blades, $\beta_1$ and $\beta_2$ are the synchronizing speed coefficients, and $\theta_1$ and $\theta_2$ are the synchronizing angles.

10. The electronic cam curve generating method of claim 8 wherein when a result of the comparison of the critical cutting length $L_{jag}$ with the set cutting length $L_{set}$ is $L_{jag}>L_{set}$ or $L_{jag}<L_{set}$, an electronic cam curve pattern for preventing a reverse rotation is created by setting the following parameter:

when $L_{jag}>L_{set}$ is set as, $$T_{12} = \frac{T_c - T_{01} - T_{45}}{2}$$

$$T_{23} = 0$$

$$T_{34} = \frac{T_c - T_{01} - T_{45}}{2}$$

$$\omega_1 = \frac{2\pi}{T_{12} + T_{34}}$$

$$\omega_2 = \frac{\pi}{T_{12} + T_{34}}$$

$$A = A$$

and when $L_{jag}<L_{set}$ is set as, $$\omega_1 = \frac{2\pi}{T_{jag}}$$

$$\omega_2 = \frac{\pi}{T_{jag}}$$

-continued $$T_{12} = \frac{\pi - \alpha}{\omega_2}$$

$$T_{34} = T_{jag} - T_{12}$$

$$T_{23} = T_C - T_{01} - T_{12} - T_{34} - T_{45}$$

$$A = A_{jag}.$$

11. The electronic cam curve generating method of claim 3, wherein correction coefficients A and $A_{jag}$ of a speed function and a position function, $T_{jag}$ corresponding to $L_{jag}$, and a stop phase angle a are obtained as the correction coefficient $A_{jag}$ for generating an electronic cam curve passing through a point having an acceleration of 0 and a speed of 0 such as, $$A_{jag} = -V_L\left(\frac{\beta_1 + \beta_2}{8r} + \frac{\sqrt{\beta_1\beta_2}}{4r}\right)$$

the correction coefficient A from a cutting length set to an operation panel, $$A = V_L\frac{\theta_{cut} - \theta_1 - \theta_2 - \frac{\beta_1 + \beta_2}{2r}\left(L_{set} - \frac{r\theta_1}{\beta_1} - \frac{r\theta_2}{\beta_2}\right)}{L_{set} - \frac{r\theta_1}{\beta_1} - \frac{r\theta_2}{\beta_2}}, \text{ and}$$

$T_{jag}\cdot\alpha$ when a value set to $L_{set}$ is equal to $L_{jag}$ from the following equation;

$$T_{jag} = \frac{L_{jag} - r\left(\frac{\theta_1}{\beta_1} + \frac{\theta_2}{\beta_2}\right)}{V_L}$$

$$\alpha = \mathrm{Tan}^{-1}\left\{\frac{\sqrt{\left(\beta_1 + \beta_2 + 2\sqrt{\beta_1\beta_2}\right)^2 - (\beta_1 - \beta_2)^2}}{\beta_1 - \beta_2}\right\}.$$

12. The electronic cam curve generating method according to claim 8, wherein the electronic cam curve divides one cutting and control cycle to be a reference into a large number of sections, and a speed function pattern and a position function pattern which are represented by an approximate equation through a trigonometric function for each of the sections are calculated in an identical algorithm respectively and a whole synthesis and generation is carried out.

13. The electronic cam curve generating method according to claim 9, wherein the critical cutting length $L_{jag}$ is determined by one calculation.

14. An electronic cam type rotary cutter control apparatus comprising:

a counter operable to pulse count an amount of movement of a workpiece from a measure roll PG of a mechanical apparatus including a measure roll, a cutter roll and a feed roll operable to serve to carry out a work for cutting the workpiece, a differentiating circuit operable to differentiate the count value to calculate a moving speed of the workpiece and to output the moving speed to a multiplier, thereby constituting a feedforward;

a triangular wave generator operable to convert the count value into a triangular wave having an amplitude in a certain amount, a speed function generator operable to generate a cam curve speed pattern by a correction output of the triangular wave generator, a position function generator operable to generate a cam curve position pattern from the correction output of the triangular wave generator, a position loop constituting a feedback control based on the correction output of the position function generator and an amount of movement of a motor, a speed controller operable to perform A/D converting and inputting a speed feedforward output of the multiplier and an output of the position loop and reading a value of the motor PG, thereby controlling a speed of the motor, an electronic cam curve parameter setting unit having an operator unit operable to input a set cutting length $L_{set}$ to a comparator and a cutter roll radius r, the number of blades M, synchronizing speed coefficients $\beta_1$ and $\beta 2$ and synchronizing angles $\theta_1$ and $\theta_2$ to a first calculator, the first calculator operable to calculate a critical cutting length $L_{jag}$ based on a value input from the operator unit, the comparator operable to compare the cutting length $L_{jag}$ thus calculated with the set cutting length $L_{set}$, a second calculator operable to set A=A and calculate and output each of parameters of $T_{12}$, $T_{23}$, $T_{34}$, $\omega_1$ and $\omega_2$ in case of $L_{jag}>L_{set}$ and setting $A=A_{jag}$ and calculate and output each of the parameters of $\omega_1$, $\omega_2$, $T_{12}$, $T_{34}$ and $T_{23}$ in case of $L_{jag}<L_{set}$ based on a result of the comparison carried out by the comparator, and a setting unit operable to carry out a write to the speed function generator and the position function generator in order to generate an electronic cam curve for preventing a reverse rotation based on each of the parameters output from the second calculator.

* * * * *